Feb. 25, 1958  R. WEISS  2,824,503
QUICK ATTACHABLE MOUNTING FOR PHOTOGRAPHIC CAMERAS
Filed Sept. 2, 1955  3 Sheets-Sheet 1

Feb. 25, 1958 R. WEISS 2,824,503
QUICK ATTACHABLE MOUNTING FOR PHOTOGRAPHIC CAMERAS
Filed Sept. 2, 1955 3 Sheets-Sheet 2

Feb. 25, 1958 R. WEISS 2,824,503
QUICK ATTACHABLE MOUNTING FOR PHOTOGRAPHIC CAMERAS
Filed Sept. 2, 1955 3 Sheets-Sheet 3

United States Patent Office 2,824,503
Patented Feb. 25, 1958

2,824,503

QUICK ATTACHABLE MOUNTING FOR PHOTOGRAPHIC CAMERAS

Richard Weiss, Braunschweig, Germany, assignor to Franke & Heidecke, Fabrik Photographischer Prazisions-Apparate, Braunschweig, Germany, a firm Application September 2, 1955, Serial No. 532,219

Claims priority, application Germany September 10, 1954

9 Claims. (Cl. 95—86)

This invention relates to means for securing a photographic camera rapidly to, and detaching the camera rapidly from, a supporting device such as a tripod or other equipment or accessory.

An object of the invention is the provision of generally improved and more satisfactory securing and release means for this purpose.

Another object is the provision of securing and release means so designed and constructed that the camera is held firmly against turning movement or change in orientation.

Still another object is the provision of holding means so designed and constructed that when the camera is removed from the holding means, it may easily and quickly be remounted upon the holding means in exactly the same position which it occupied previously, such reestablishment of the same identical position being important in certain types of picture taking or copying.

Still another object is the provision of mounting means which may be operated with the ultmost ease and rapidity, both in mounting the camera upon and removing it from the tripod or other support.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
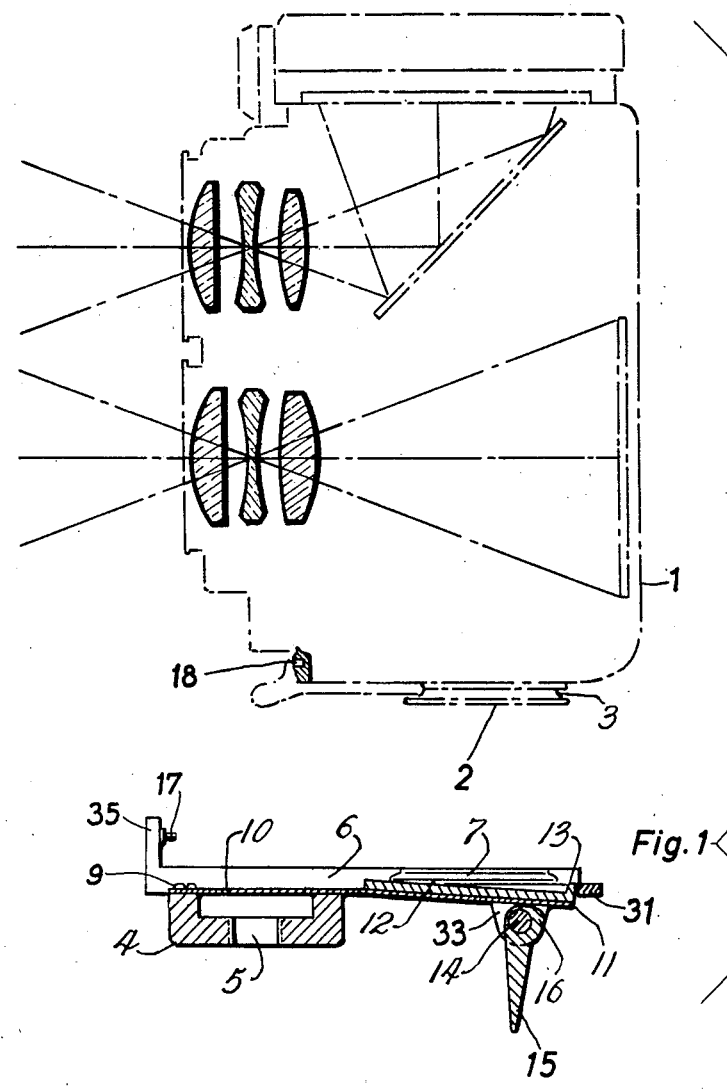
Fig. 1 is a vertical section taken centrally through mounting means according to a preferred embodiment of the present invention, showing in diagrammatic outline a camera in position ready to be mounted thereon.

The attaching means or mounting means of the present invention may be used with any suitable kind or type of camera, preferably a portable camera. Merely for the sake of a convenient example, there is here shown a camera 1 of the twin lens reflex type, such as the well known Rolleiflex camera manufactured in Germany by the assignee of the present application. This camera comprises a lower lens for projecting an image onto the film and an upper lens for projecting the image onto a reflecting mirror and thence upwardly to a horizontal focusing screen arranged at the top of the camera.

On the bottom of this camera, or any camera with which the present invention is to be used, there is a mounting member 2 in the form of a circular disk or short cylinder of sufficient thickness (or axial length) so that a circumferentially extending groove 3 may be formed around the entire periphery of the disk 2. This mounting element 2 may be permanently fastened to the camera body, or it may be a separate attachment having an upwardly projecting stud at its center, threaded with a screw thread of the standard tripod mounting stud size, so that this attachment may be screwed into the usual tripod screw socket formed in the bottom of the camera body.

Figure 2:
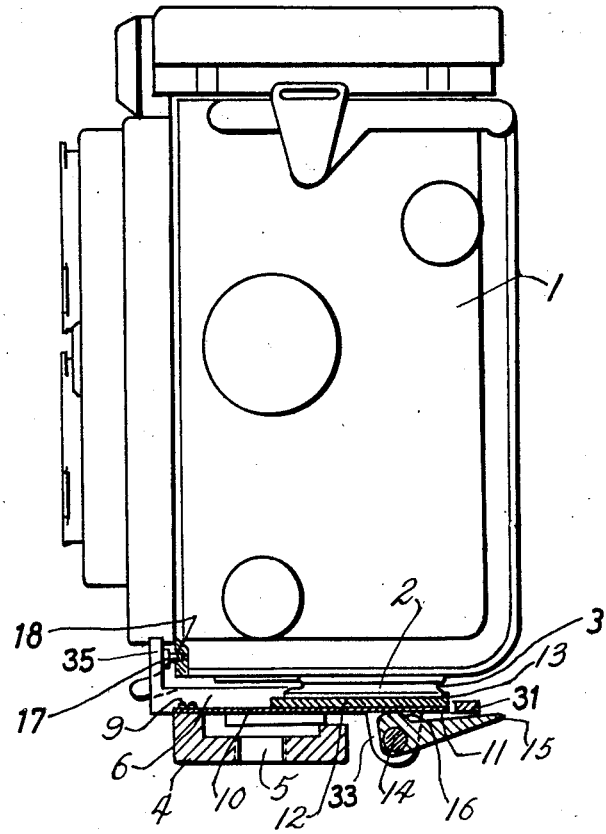
Fig. 2 is a similar view with the camera mounted on the mounting means.
Figure 3:
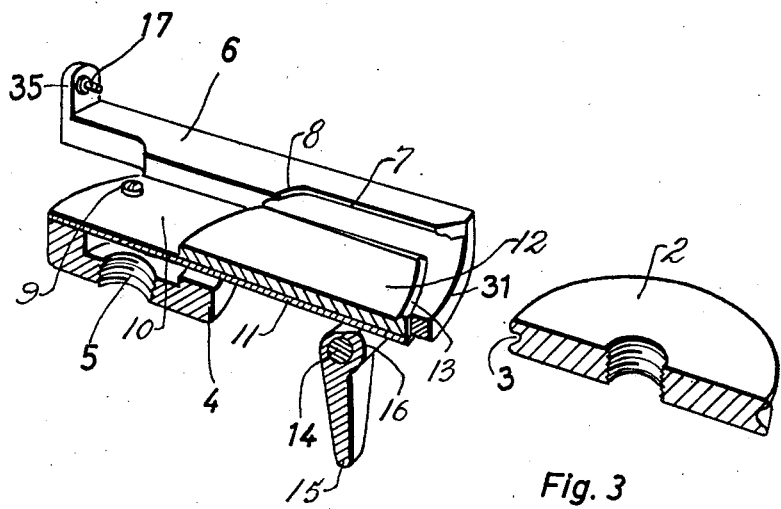
Fig. 3 is an enlarged perspective section taken vertically along the center line of the supporting parts and of the cooperating mounting member of the camera in a position about to be engaged with the supporting parts.

For use with such a mounting element 2 and groove 3, there is provided a mounting base member 4 having a central aperture 5 screw threaded to receive the standard threaded stud of a tripod or the like, so that this base member 4 may be attached to any conventional tripod or similar support, including a unipod, a hand holder, etc. Integral with or firmly secured to the base member 4 there is a pair of metal rails 6 extending parallel to each other and having their rear portions provided with inwardly faced or opposed lateral edges 7 which are thinned and spaced laterally from each other just enough to receive the grooved part 3 of the mounting disk 2 snugly between these edges 7. The rear ends of the rails are open or unconfined. The member 2 is placed on the rails 6 by sliding it horizontally forwardly onto the rear ends of the rails, from the completely detached position shown in Fig. 3 to the engaged position shown in Fig. 2.

Forward motion of the member 2 along the edges 7 of the rails 6 is limited by shoulders 8 on the rails, which engage with and stop the forward progress of the member 2. The rear ends of the rails 6 project a substantial distance rearwardly from the mounting base 4 and so the rails are laterally connected to each other at their rear ends, for additional strength, by a brace or web 31, which lies below the horizontal plane defined by the mounting edges 7 of the two rails 6, so as to offer no obstruction to the movements of the mounting element 2.

Means are provided for clamping the member 2 on the rails 6. A flat leaf spring 10 is secured to the mounting base 4 by screws 9 and projects rearwardly therefrom to a point just ahead of the cross brace 31, the spring being supported in cantilever fashion so that the rear portion 11 thereof may flex upwardly and downwardly. The spring is below the plane of the edges 7 of the rails 6. On this rear portion 11 is a clamping plate or shoe 12, the rear edge of which is formed with an upwardly projecting ridge or rib or bolt portion 13 arranged to fit snugly behind the rear edge of the member 2 when the latter is in its extreme forward position tight against the shoulders 8.

Depending from the rear surfaces of the rails 6, near their rear ends and just a little ahead of the cross brace 31, are a pair of ears 33 which support the ends of a cross shaft 14. A latching bar or clamping bar 15 is rotatable on the shaft 14 and has an eccentric cam portion 16 arranged to press upwardly on the bottom of the spring 10 and lift the rear end of this spring when the bar 15 is moved to the clamping position shown in Fig. 2. When the bar 15 is swung downwardly to the released position shown in Fig. 3, the cam 16 moves so as to allow the rear end 11 of the spring 10 to move downwardly, so that the bolt rim or ridge 13 lies below the level of the member 2 and does not obstruct the forward or rearward motion of the member 2 when placing it on or removing it from the rails 6. But when the clamping lever 15 is swung up to its clamping position shown in Fig. 2, it raises the rear end 11 of the spring 10 to perform a double function. First, it brings the rim or ridge 13 up close behind and in contact with the rear edge of the member 2, holding the member 2 against any rearward sliding movement on the rails 6. Second, the flat surface of the plate or shoe 12 presses firmly upwardly against the flat bottom surface of the disk or cylindrical member 2, thereby additionally clamping the member 2 and preventing any rotation thereof. The clamping lever 15 is held in its effective clamping position by friction.

It is desirable to provide additional means for holding the camera against rotation on the mounting mechanism, and also for insuring that when the camera has been removed from the mount, it may be placed again in exactly the same position of orientation, if desired. This additional means comprises two upstanding ears 35 at the forward ends of the rails 6, which ears carry two rearwardly projecting pins 17 which enter openings or sockets 18 in the lower part of the front wall of the camera body 1, when the camera is moved forwardly to its home position. This makes it easy to replace the camera, after removal, in precisely the same position as before, and additionally retains the camera against any possibility of rotation relative to the base 4 of the mount.

Figure 4:
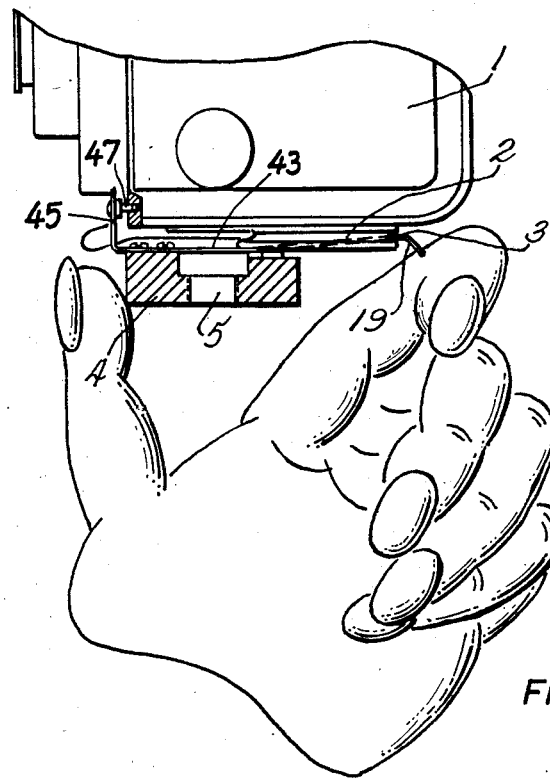
Fig. 4 is a view similar to Fig. 2 showing an alternative construction.
Figure 5:
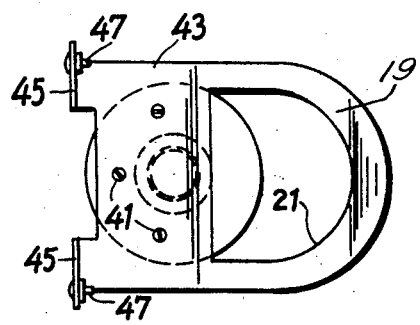
Fig. 5 is a plan of part of the mechanism shown in Fig. 4.

In the simplified form of construction shown in Figs. 4 and 5, the mounting part 2 on the camera is the same as before, and the mounting part or base 4 is the same as before, but the other parts are different. The base 4 in this instance has firmly attached to it, as by screws 41, a resilient spring member 43, mounted in cantilever fashion, the rear end 19 of which has a cutout 21 with a curved rear edge of substantially the same radius as the member 2 on the camera body, so that the rear portion of the spring plate 43 has the general appearance of a stirrup as seen in Fig. 5. The front end of the plate 43 has upturned ears 45 which carry rearwardly projecting pins 47 like the pins 17 in the first embodiment, and likewise intended to enter the sockets or openings 18 in the front wall of the camera body 1.

In this embodiment, the mounting of the camera is achieved by moving the camera body forwardly horizontally until the sockets 18 of the camera body are seated on the pins 47. The flat bottom face of the mounting member 2 of the camera body rests partially upon the top of the plate 43, while the cut away rear or curved part 19 of the plate 43, due to its initial set, resiliently springs upwardly to embrace tightly around the rear edge of the mounting member 2 on the camera, or engage in the groove 3 thereof, in approximately the position shown in Fig. 4. When it is desired to remove the camera, the operator's finger is engaged with the extreme rear end of the spring plate 43, which is bent downwardly for easy grasping as seen in Fig. 4, and this extreme rear end is flexed or swung downwardly a slight distance to disengage the edge 21 from the rear of the mounting member, whereupon the camera body may be moved slightly rearwardly to disengage it from the pins 47.

In both embodiments of the invention, the pins 17 or 47 constitute fixed stops holding the camera, and the parts 13 or 19 constitute movable stops cooperating with the cylindrical part 2 of the camera to hold it in place against the fixed stops. In the first embodiment, the shoulders 8 constitute additional fixed stops, the edges 7 constitute means for holding the camera against movement in a direction axially of the cylindrical element 2, and the plate 12 constitutes additional clamping means preventing both rotary movement of the camera and also sliding movement longitudinally along the rails.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body having a projecting portion formed with grooves on two opposite sides thereof, of a quick attachable mount for said camera body, said mount comprising a pair of mounting rails having substantially parallel and laterally spaced edges for receiving said projecting portion of said camera body between them and extending into said grooves when said projecting portion is so received, a fixed stop for limiting movement of said projecting portion along said rails in one direction, a movable stop shiftable between effective and ineffective positions and serving, when in its effective position, to limit movement of said projecting portion along said rails in the opposite direction, a resilient spring member operatively connected to said movable stop and tending to shift said movable stop to ineffective position, and cam means for shifting said stop to effective position.

2. The combination with a photographic camera body having a projecting portion formed with grooves on two opposite sides thereof, of a quick attachable mount for said camera body, said mount comprising a pair of mounting rails having substantially parallel and laterally spaced edges for receiving said projecting portion of said camera body between them and extending into said grooves when said projecting portion is so received, a fixed stop for limiting movement of said projecting portion along said rails in one direction, a movable stop shiftable between effective and ineffective positions and serving, when in its effective position, to limit movement of said projecting portion along said rails in the opposite direction, a leaf spring having one end fixed relative to said rails and having another end movable toward and away from the common plane of the rails by flexing the spring, and a shoe member carried by said spring near said other end thereof in position to engage with said projecting portion of the camera body when said projecting portion is in normally mounted position on said rails and when said spring is flexed to move said other end toward said plane of the rails.

3. A construction as defined in claim 2, in which said movable stop is formed on said shoe.

4. The combination with a photographic camera body having a projecting portion formed with grooves on two opposite sides thereof, of a quick attachable mount for said camera body, said mount comprising a pair of mounting rails having substantially parallel and laterally spaced edges for receiving said projecting portion of said camera body between them and extending into said grooves when said projecting portion is so received, a fixed stop for limiting movement of said projecting portion along said rails in one direction, a movable stop shiftable between effective and ineffective positions and serving, when in its effetcive position, to limit movement of said projecting portion along said rails in the opposite direction, an aperture in said camera body at a substantial distance from said projecting portion, and a fixed pin on said mount for engaging in said aperture to hold said camera body in a fixed predetermined position of orientation with respect to said mount when said camera body is fully mounted thereon.

5. A quick attachable mount for photographic cameras of the type having a front wall with an aperture therein and a bottom wall provided with a projecting mounting portion of substantially circular outline with a peripheral groove extending circumferentially around said mounting portion, said mount comprising a base having a threaded aperture for threaded engagement with a mounting screw of a tripod or the like, means including a pin mounted in fixed position on said base for engaging the front wall of said camera and entering said aperture in said wall to define a predetermined position of the camera relative to the base, and releasable means for engaging an edge of said projecting mounting portion of the camera remote from said front wall, to tend to hold said front wall in engagement with said first mentioned means, said releasable means when released being in non-obstructing relation to said projecting mounting portion so that said mounting portion and the camera carried thereby may move in a direction away from said pin, to withdraw said pin from said aperture in said front wall.

6. A construction as defined in claim 5, in which said other means is resiliently mounted for movement approximately in a direction approximately perpendicular to the plane of said bottom wall.

7. Quick attachable mounting means for photographic cameras of the type having a vertical wall and a bottom wall provided with a downwardly projecting mounting portion of substantially circular outline with a peripheral groove extending circumferentially around said projecting portion, said mounting means comprising a pair of rails spaced laterally from each other and having edges adapted to embrace said projecting portion at opposite ends of any diameter thereof and engage in said groove to hold the camera against movement in a vertical direction axially of said projecting portion, upstanding means near one end of said rails engaging said vertical wall of said camera for holding the camera against rotary movement relative to said rails, and means near the other end of said rails for holding the camera against a releasing movement longitudinally along said rails in a direction away from said upstanding means.

8. Quick attachable mounting means for photographic cameras of the type having a projecting mounting portion of substantially circular outline with a peripheral groove extending circumferentially around said projecting portion, said mounting means comprising a base, a pair of rails mounted in fixed position on said base and having edges arranged substantially parallel to each other and laterally spaced from each other to embrace said projecting portion of the camera and to be received in said groove thereof, said rails being open at one end so that said projecting portion of the camera may be slid longitudinally onto said rails at said open end, a leaf spring fixed at one end to said base and projecting in cantilever fashion from the fixed end to a position beneath said projecting portion of a camera normally mounted on said rails, means on said spring for engaging and holding said projecting portion of a normally mounted camera when said spring is flexed upwardly, and means including an operating handle for flexing said spring upwardly.

9. Quick attachable mounting means for photographic cameras of the type having a projecting mounting portion of substantially circular outline with a peripheral groove extending circumferentially around said projecting portion, said mounting means comprising a base, a pair of rails mounted in fixed position on said base and having edges arranged substantially parallel to each other and laterally spaced from each other to embrace said projecting portion of the camera and to be received in said groove thereof, said rails being open at one end so that said projecting portion of the camera may be slid longitudinally onto said rails at said open end, a leaf spring fixed at one end to said base and projecting in cantilever fashion from the fixed end to a position beneath said projecting portion of a camera normally mounted on said rails, means on said spring for engaging and holding said projecting portion of a normally mounted camera when said spring is flexed upwardly, a shaft mounted on said base and extending beneath said spring, a movable operating handle on said shaft, and an eccentric cam associated with said handle for engaging said spring and flexing it upwardly when said handle is moved from one predetermined position to another.

References Cited in the file of this patent

UNITED STATES PATENTS

| | | |
|---|---|---|
| 962,844 | Kaufmann | June 28, 1910 |
| 2,351,386 | Zucker | June 13, 1944 |
| 2,614,471 | Markowitz | Oct. 21, 1952 |

FOREIGN PATENTS

| | | |
|---|---|---|
| 931,376 | Germany | Aug. 8, 1955 |